United States Patent
Buttle et al.

(10) Patent No.: US 12,035,731 B2
(45) Date of Patent: Jul. 16, 2024

(54) FEED COMPOSITIONS CONTAINING FAECAL BINDER MATERIALS

(71) Applicant: CAN Technologies, Inc., Hopkins, MN (US)

(72) Inventors: Louise Georgina Buttle, Herts (GB); May-Helen Holme, Stavanger (NO); Peter Bjorn Rugroden, Dirdal (NO); Kari Juhani Ruohonen, Turku (FI); Terje Utne, Stavanger (NO)

(73) Assignee: CAN TECHNOLOGIES, INC., Wayzata, MN (US)

( * ) Notice: Subject to any disclaimer, the term of this patent is extended or adjusted under 35 U.S.C. 154(b) by 823 days.

(21) Appl. No.: 15/491,357

(22) Filed: Apr. 19, 2017

(65) Prior Publication Data

US 2017/0295826 A1     Oct. 19, 2017

Related U.S. Application Data

(60) Provisional application No. 62/324,649, filed on Apr. 19, 2016.

(51) Int. Cl.
| | | |
|---|---|---|
| *A23K 50/80* | (2016.01) | |
| *A23K 10/30* | (2016.01) | |
| *A23K 20/10* | (2016.01) | |
| *A23K 20/147* | (2016.01) | |
| *A23K 20/158* | (2016.01) | |
| *A23K 20/163* | (2016.01) | |

(Continued)

(52) U.S. Cl.
CPC .............. *A23K 50/80* (2016.05); *A23K 10/30* (2016.05); *A23K 20/10* (2016.05); *A23K 20/147* (2016.05); *A23K 20/158* (2016.05); *A23K 20/163* (2016.05); *A23K 20/174* (2016.05); *A23K 20/20* (2016.05); *A23K 40/25* (2016.05); *Y02A 40/818* (2018.01)

(58) Field of Classification Search
CPC .... A23K 50/80; A23K 20/147; A23K 20/158; A23K 20/163; A23K 20/174; A23K 20/20; A23K 40/25; A23K 10/30; A23K 20/10; Y02A 40/818
See application file for complete search history.

(56) References Cited

U.S. PATENT DOCUMENTS

| | | | |
|---|---|---|---|
| 2009/0152192 A1 | 6/2009 | Michaels, II | |
| 2009/0197321 A1* | 8/2009 | Chiou ..................... | C12P 23/00 435/252.33 |
| 2009/0202672 A1* | 8/2009 | Hartnell ................. | A23K 10/22 426/2 |

FOREIGN PATENT DOCUMENTS

| | | |
|---|---|---|
| CA | 2566485 C | 11/2010 |
| EP | 2570034 A1 | 1/2016 |

(Continued)

OTHER PUBLICATIONS

El-Saidy, "Evaluation of Cluster Bean Meal Cyamposis fefrugonoloba as a Dietary Protein Source for Common Carp *Cyprinus carpio* L.", World aquaculture Society, 2005, 36(3), pp. 311-319.*

(Continued)

*Primary Examiner* — Changqing Li

(57) ABSTRACT

An extruded, pressed or particulate fish feed is described. Also described is a method for reduction of the content of undesired nutrients in water discharged from a fish farm, and a process for increasing the mechanical strength or shear resistance of faeces from fish in a fish farm.

20 Claims, 3 Drawing Sheets

(51) Int. Cl.
  *A23K 20/174* (2016.01)
  *A23K 20/20* (2016.01)
  *A23K 40/25* (2016.01)

(56) References Cited

FOREIGN PATENT DOCUMENTS

| EP | 3235385 A1 | 10/2017 | |
|---|---|---|---|
| GB | 2142636 A | 1/1985 | |
| NO | 323529 B1 | 6/2007 | |
| WO | WO-2005110113 A1 * | 11/2005 | ............. A23K 40/20 |

OTHER PUBLICATIONS

Brinker, "Optimizing Trout Farm Effluent Treatment by Stabilizing Trout Feces: A Field Trial", North American Journal of Aquaculture, 2005, 67(3), pp. 244-258.*
Bureau, "Letter to the Editor of Aquaculture" Aquaculture, 2006, 252, 103-105.*
Kalanjiam, "Effect of Guar (*Cyamopsis tetragonolobus* ) Meal Based Diets on Growth Performance and Feed Utilization in Asian Catfish, Pangasianodon hypophthalmus Fingerlings", J. Fish. Soc. Taiwan, 2014, 41(2), pp. 135-144 (Year: 2014).*
Lee, "Quantitative Measurement of Negligible Trypsin Inhibitor Activity and Nutrient Analysis of Guar Meal Fractions", J. Agric. Food Chem. 2004, 52(21), 6492-6495. (Year: 2004).*
Brinker, "Guar gum in rainbow trout (*Oncorhynchus mykiss*) feed: The influence of quality and dose on stabilisation of faecal solids", Aquaculture, 2007, 267, 315-327. (Year: 2007).*
Naylor, Rosamond L., et al., "Effects of Aquaculture on World Fish Supplies", Issues in Ecology, No. 8, (Winter 2001), 1-12.
Hasan, Mohammad R., et al., "Nutrition and Feeding for Sustainable Aquaculture Development in the Third Millennium", Aquaculture in the Third Millennium. Technical Proceedings of the Conference on Aquaculture in the Third Millennium, Bangkok, Thailand, (Feb. 20-25, 2000), 193-219.
Sales, James, "Prediction of digestible energy content across feed ingredients and fish species by linear regression", Fish Physiol Biochem (2009) 35, (Nov. 25, 2008), 551-565.
"Chilean Application Serial No. 201700980, Office Action mailed Aug. 9, 2021", w/ English translation, 6 pgs.
"European Application Serial No. 17167056.5, Extended European Search Report mailed Sep. 18, 2017", 12 pgs.
"European Application Serial No. 17167056.5, Office Action mailed Dec. 18, 2019", 4 pgs.
"European Application Serial No. 17167056.5, Partial European Search Report mailed Jun. 12, 2017", 12 pgs.
"European Application Serial No. 17167056.5, Third Party Observation mailed May 28, 2020", 29 pgs.
"Norwegian Application Serial No. 20160674, Office Action mailed Sep. 17, 2021", with machine translation, 5 pgs.
"Stortare-en verdifull ressurs" [Kelp—a valuable resource] FMC Biopolymer [Online] Retrieved from the internet <URL: http//www.stortare.no/?page_id=385> retrieved on Sep. 21, 2016, written in 2013 by FMC Corporation, 4 pages [machine translation].
Storebakken et al., "Binders in fish feeds: I. Effect of alginate and guar gum on growth, digestibility, feed intake and passage through the gastrointestinal tract of rainbow trout", Aquaculture, Elsevier, Amsterdam, NL, Jan. 1, 1985 (Jan. 1, 1985), 47(1):11-26, XP008073365, ISSN: 0044-8486.
Database Biosis [Online] Biosciences Information Service, Philadelphia, PA, US; Feb. 2014 (Feb. 2014), IQBAL Khalid Javed et al: "Effect of Plant-Fishmeal and Plant By•Product Based Feed on Growth, Body Composition and Organoleptic Flesh Qualities of Labeo rohita", XP002770402, Database accession No. PREV201400354128.
Database Biosis [Online] Biosciences Information Service, Philadelphia, PA, US; Feb. 2016 (Feb. 2016), IQBAL Khalid Javed et al: "Effect of Different Plant and Animal Origin (Fishmeal) Feeds on Digestive Enzyme Activity and Haematology of Juvenile Labeo rohita", XP002770401, Database accession No. PREV201600215583.
Garg et al., "Evaluation of raw and hydrothermically processed leguminous seeds as supplementary feed for the growth of two Indian major carp species", Aquaculture Research, vol. 33, No. 3, Mar. 1, 2002 (Mar. 1, 2002), pp. 151-163, XP093022475.
Iqbal et al., "Effect of plant-fishmeal and plant by-product based feed on growth, body composition and organoleptic flesh qualities of Labeo rohita," Pakistan Journal of Zoology, Feb. 1, 2014; vol. 46(1), pp. 253-260.
Lee et al., "Guar Meal Germ and Hull Fractions Differently Affect Growth Performance", Poultry Science, 82, pp. 1589-1595, 2003.
Paolucci et al., "Development of biopolymers as binders for feed for farmed aquatic organisms," Aquaculture, Jan. 34, 2012 pages www.interchopen.com, [retrieved from the internet Sep. 16, 2016].
Reid et al., "A review of the biophysical properties of salmonid faeces: implications for aquaculture waste dispersal modes and integrated multi-trophic aquaculture," Aquaculture Research, 2009, 40, 257-273.

\* cited by examiner

FEED COMPOSITIONS CONTAINING FAECAL BINDER MATERIALS

CROSS REFERENCE TO RELATED APPLICATIONS

This application claims the benefit of U.S. Provisional Patent Application No. 62/324,649, filed Apr. 19, 2016, which application is hereby incorporated by reference herein in its entirety.

FIELD OF THE INVENTION

The invention relates to an extruded, pressed or particulate fish feed, and to a method for reduction of the content of undesired nutrients in water discharged from a fish farm, and to a process for increasing the mechanical strength or shear resistance of faeces from fish in a fish farm.

BACKGROUND OF THE INVENTION

The use of Recirculating Aquaculture System (RAS) systems for land based rearing of salmon smolt is becoming more common. A RAS system operates by filtering the water from the fish tanks so that it can be reused within the tank or emitted to the environment. Both marine and fresh water systems are known.

Feed remnants and faeces in solid and dissolved form bring undesired compounds such as nutrients to the water body. The content of nutrients can be reduced by using highly digestible feed, but it has been shown that an effective reduction of the nutrients only can be obtained by filtering and separating the faeces particles and remaining feed particles from the water. It is thus important that the suspended faeces particles have a sufficient strength and are not disintegrated into finer and unfilterable particles.

It is thus an object of the present invention to provide a feed composition which can be fed to farmed fish and which leads to faeces particles with increased shear resistance, so that decomposition of the faeces particles is prevented or reduced.

It is also an object of the present invention to obtained feed composition with increased shear resistance so that uneaten feed particles are not degraded into smaller particles in the water body.

It is a further object to the present invention to enable efficient filtration and separation of the undecomposed faeces and feed particles from the water body in order to decrease the leakage of nutritious compounds and other undesired compounds from the faeces and feed particles into the water.

NO323529 discloses a feed composition which increases the particle size of trout faeces. The feed contains, in addition to starch as an ordinary binder, a so-called "faecal binder" of a non-starch type. The faecal non-starch binder can be alginate, algal meal or guar gum. The patent clearly indicates that only non-starch fish feed binders are capable of obtaining faeces with an increased resistance to degradation.

It is thus a further object of the present invention to provide alternative faecal binders, i.e. binders provided in the feed composition that enhances the resistance to degradation of the faeces particles, and preferable also the feed particles.

SUMMARY OF THE INVENTION

A first aspect of the present invention relates to an extruded, pressed or particulate fish feed, wherein the fish feed comprises feed ingredients such as proteins, lipids/oils, carbohydrates, minerals and vitamins, and wherein a portion of said proteins is guar meal.

In a preferred embodiment is said guar meal extracted from guar beans and replaces conventional proteins.

In a preferred embodiment is said guar meal extracted from guar germ and replaces conventional proteins.

In a preferred embodiment comprises said feed 1-30% guar meal, based on total weight of the feed.

In a preferred embodiment comprises said feed 1-20% guar meal, based on total weight of the feed.

In a preferred embodiment comprises said feed about 5-12% guar meal, based on total weigh of the feed.

In a preferred embodiment comprises said feed about 5% guar meal, based on total weigh of the feed.

In a preferred embodiment is about 10-50% of said proteins guar meal.

In a preferred embodiment is about 10-25% of said proteins guar meal.

In a preferred embodiment is the feed is extruded and the guar meal is added to the feed ingredients before extrusion.

In a preferred embodiment comprises the feed also a starch type binding agent.

In a preferred embodiment comprises the feed also a non-starch type binding agent.

In a preferred embodiment is said non-starch binding agent selected from the group consisting of algae meal, calcium alginate and guar gum.

In a preferred embodiment is the feed for use in Recirculating Aquaculture System (RAS) systems.

A second aspect of the present invention relates to a method for reduction of the content of undesired nutrients in water discharged from a fish farm, wherein a fish feed fed to the fish in said fish farm comprises feed ingredients such as proteins, lipids/oils, carbohydrates, minerals and vitamins, and wherein a portion of said proteins is guar meal, and wherein faeces particles and/or uneaten feed particles are removed by mechanical filtration from the water.

In a preferred embodiment is said guar meal extracted from guar beans and replaces conventional proteins.

In a preferred embodiment is said guar meal extracted from guar germ and replaces conventional proteins.

In a preferred embodiment comprises said feed comprises 1-30% guar meal, based on total weight of the feed.

In a preferred embodiment comprises said feed 1-20% guar meal, based on total weight of the feed.

In a preferred embodiment comprises said feed about 5-12% guar meal, based on total weight of the feed.

In a preferred embodiment comprises said feed about 5% guar meal, based on total weight of the feed.

In a preferred embodiment is about 10-50% of said proteins guar meal.

In a preferred embodiment is about 10-25% of said proteins guar meal.

In a preferred embodiment is the fish farm a Recirculating Aquaculture System (RAS) system, wherein faeces particles and/or uneaten feed particles are removed from the water, and the water is recirculated to the fish farm.

A third aspect of the present invention relates to a process for increasing the mechanical strength or shear resistance of faeces from fish in a fish farm, wherein a fish feed fed to the fish in said fish farm comprises feed ingredients such as proteins, lipids/oils, carbohydrates and vitamins, and wherein a portion of said proteins is guar meal.

In a preferred embodiment is said guar meal extracted from guar beans and replaces conventional proteins.

In a preferred embodiment is said guar meal extracted from guar germ and replaces conventional proteins.

In a preferred embodiment comprises said feed 1-30% guar meal, based on total weight of the feed.

In a preferred embodiment comprises said feed 1-20% guar meal, based on total weight of the feed.

In a preferred embodiment comprises said feed about 5-12% guar meal, based on total weight of the feed.

In a preferred embodiment comprises said feed about 5% guar meal, based on total weight of the feed.

In a preferred embodiment is about 10-50% of said proteins guar meal.

In a preferred embodiment is about 10-25% of said proteins guar meal.

In a preferred embodiment is the fish farm a Recirculating Aquaculture System (RAS) system, wherein faeces particles and/or uneaten feed particles are removed from the water, and the water is recirculated to the fish farm.

DESCRIPTION OF EMBODIMENTS OF THE INVENTION

Figure 1:
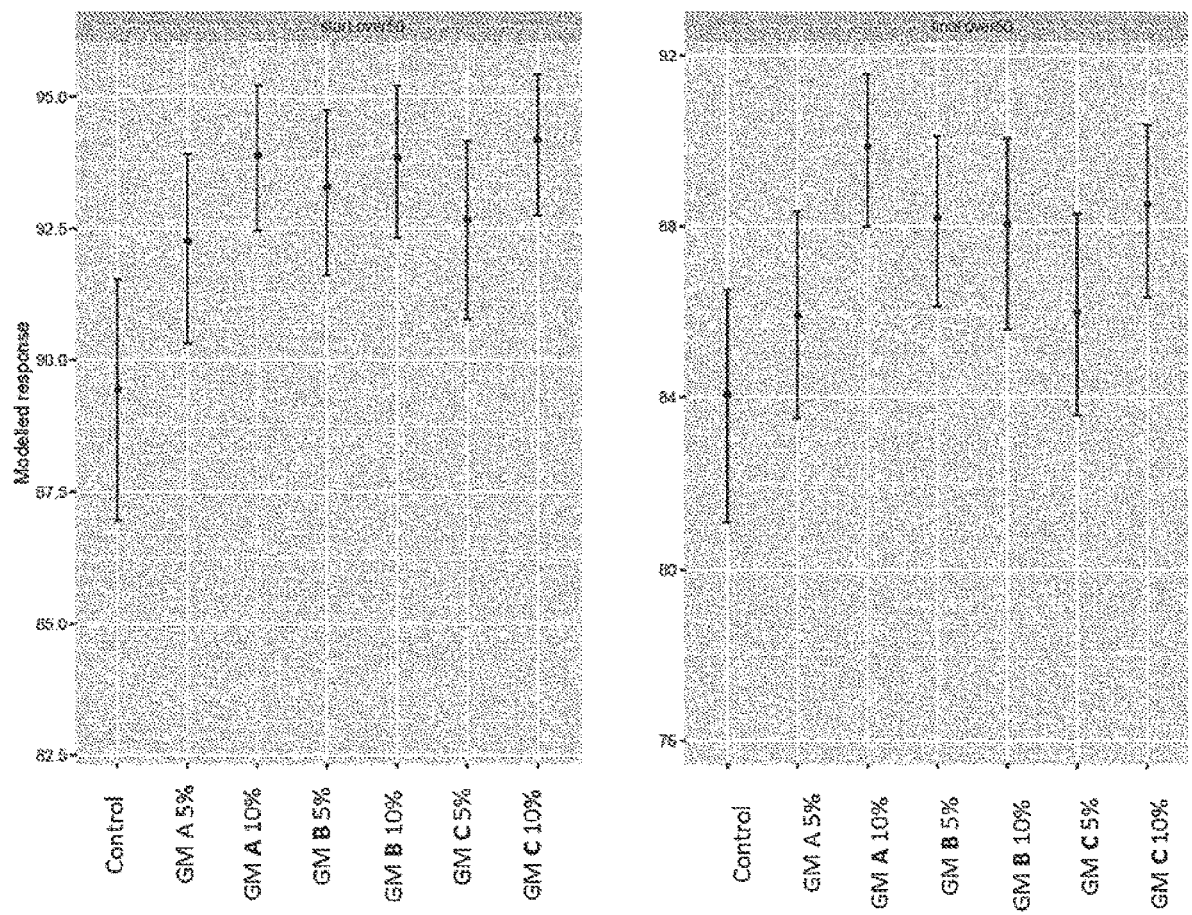
FIG. 1 shows the data output from Mastersizer for faeces particle size for various feed formulations containing different guar meal concentrations and guar meal types in the fish feed, and shows the % of particles over 50 μm (y-axis) at time 1 (initial) and at time 10 (final) in the Mastersizer, wherein the Mastersizer can be set up to take readings at constant intervals of 30 seconds for five minutes, 60 seconds for ten minutes and the like. Data shown for N=10 fish per tank, 3 tanks per treatment.

The aim of the experiments described below is to test whether various binding agents and dietary compositions in fish feed have an effect on faeces stability. An object is to find raw material inclusions that can be used as feacal binding formulations in fish feed.

Faeces particle size is an important parameter to measure since faeces is most often removed from the water by mechanical filters, meaning that any faeces particles larger than the filters cut-off value (mesh size) will be removed from the water by the filter. Particle size is thus a good measure for the faecal binding properties of the tested binding agents or feed formulations.

We have unexpectedly found that guar meal increases the particle size of faeces if the guar meal is included in the feed that is given to the fish. It is known from the prior art that guar gum has a similar effect, and we can obtain similar results with a suitable inclusion of guar meal in the formulations.

Example 1—Effect of Guar Meal in Fish Feed on Faeces Characteristics

The active compound of the present invention, i.e. guar meal is available from several commercial suppliers and has the following composition range of macronutrients: protein 40% to 66%, fat 7 to 12% and carbohydrates 10 to 20%. The guar seed consists of the hull, the endosperm and germ. The endosperm and the hull is processed to give guar gum, whereas it is mainly the germ that is processed to give the protein fraction and the guar meal. Although there will also be a protein fraction that can be processed from the hull and endosperm fraction of the guar seed. The guar meal is prepared from the guar seed by a variety of processes which may include sieving, roasting, grinding, solvent extraction and drying. We have tested a variety of guar meals for their effects on the physical characterization of faeces from the fish fed feeds with the different guar meals.

Feed Compositions

The test feeds for this trial were produced at the Technology Centre, Dirdal, Norway. The feed formulation were based on EWOS No Micro Performance feed size 50 containing a target of 35% protein and 34% fat. The detailed compositions of the formulations are given in table 1. Guar meal in the test feeds replaces vegetable protein concentrate. Guar meal A, B and C denotes three different guar meal products indicated as GM A, GM B and GM C in the figures.

Atlantic salmon were stocked in seawater tanks (n=50 fish per tank, mean weight=1918 g). Faeces was collected from the distal half of the distal intestine in fish by dissection (n=10 fish per tank, 3 tanks per treatment). Faeces were analyzed for particle size by laser diffraction on a Malvern Mastersizer 2000 using a Hydro G wet dispersion unit. The tests were done at EWOS Innovation, Dirdal.

The Mastersizer uses vigorous mixing when measuring the sample. The machine takes three measurements of the same material in succession while circulating the sample. As a result a decrease in particle size is observed as the test number increases due to the mixing activity in the instrument. The machine can take up to 10 measurements but 3 replicate measurements were determined as appropriate for this procedure.

FIG. 1 shows that the guar meal has excellent binding properties in contrast to other formulations that we have tested.

TABLE 1

| Formulation of the fish feed of example 1: | | | | | | | |
|---|---|---|---|---|---|---|---|
| | Control | Guar meal A 5% | Guar meal A 10% | Guar meal B 5% | Guar meal B 10% | Guar meal C 5% | Guar meal C 10% |
| Vegetable protein concentrate | 33.84 | 28.46 | 23.18 | 27.85 | 21.87 | 28.28 | 22.72 |

TABLE 1-continued

Formulation of the fish feed of example 1:

|  | Control | Guar meal A 5% | Guar meal A 10% | Guar meal B 5% | Guar meal B 10% | Guar meal C 5% | Guar meal C 10% |
|---|---|---|---|---|---|---|---|
| Vegetable oil | 19.77 | 19.28 | 18.89 | 19.24 | 18.94 | 19.50 | 19.23 |
| Raw wheat | 11.68 | 12.87 | 13.79 | 12.88 | 13.43 | 12.06 | 12.43 |
| Fish oil | 9.63 | 9.39 | 9.19 | 9.37 | 9.22 | 9.50 | 9.37 |
| Wheat gluten meal | 8.00 | 8.00 | 8.00 | 8.00 | 8.00 | 8.00 | 8.00 |
| Marine protein | 12.49 | 12.47 | 12.45 | 12.48 | 12.47 | 12.47 | 12.46 |
| Vegetable protein | 1.00 | 1.00 | 1.00 | 1.00 | 1.00 | 1.00 | 1.00 |
| Amino acid mix | 0.18 | 0.18 | 0.19 | 0.19 | 0.20 | 0.18 | 0.19 |
| Vitamin premix | 1.40 | 1.40 | 1.40 | 1.40 | 1.40 | 1.40 | 1.40 |
| Mineral premix | 1.91 | 1.85 | 1.81 | 1.82 | 1.74 | 1.86 | 1.81 |
| Astaxanthin 10% | 0.08 | 0.08 | 0.08 | 0.08 | 0.08 | 0.08 | 0.08 |
| Guar meal A |  | 5.00 | 10.00 |  |  |  |  |
| Guar meal B |  |  |  | 5.67 | 11.63 |  |  |
| Guar meal C |  |  |  |  |  | 5.65 | 11.29 |
| Yttrium oxide | 0.02 | 0.02 | 0.02 | 0.02 | 0.02 | 0.02 | 0.02 |
|  | 100.00 | 100.00 | 100.00 | 100.00 | 100.00 | 100.00 | 100.00 |

Example 2—Effect of Fish Feed Guar Meal on Faeces Characteristics

We have tested a variety of guar meals for their effects on the physical characterization of faeces from the fish fed feeds with the different guar meals. Guar meal C (termed GM C) has been tested in a different feed formulation (table 2) in the concentration of 6 and 12%.

Feed Compositions

The test feeds for this trial were produced at the Technology Centre, Dirdal, Norway. The feed formulation were based on EWOS No Micro Performance feed size 50 containing a target of 43% protein and 24% fat. The detailed compositions of the formulations are given in table 2.

TABLE 2

Formulations of the fish feed of example 2.

|  | Control | GM D 6% | GM D 12% |
|---|---|---|---|
| Fish meal | 35.23 | 34.00 | 34.00 |
| Vegetable protein concentrate | 20.00 | 16.00 | 8.00 |
| Raw wheat | 12.46 | 12.15 | 14.21 |
| Fish oil | 9.02 | 9.12 | 9.21 |
| Vegetable oil | 9.02 | 9.12 | 9.21 |
| Wheat gluten meal | 8.00 | 7.13 | 6.58 |
| Vegetable protein | 3.00 | 3.00 | 3.00 |
| Amino acid | 1.25 | 1.38 | 1.63 |
| vitamin premix | 0.65 | 0.65 | 0.65 |
| Mineralmix EWOS | 1.35 | 1.43 | 1.49 |
| Yttrium Oxide | 0.02 | 0.02 | 0.02 |
| Guar meal D |  | 6.00 | 12.00 |
|  | 100.00 | 100.00 | 100.00 |

Fish Sampling

Atlantic salmon (mean weight 1400 g; n=40 fish per tank) were held in tanks. Faeces were collected from each tank on a continuous basis for a limited amount of time for each tank. One sample of faeces (not less than 5 g) was collected per tank, and analyzed in the Mastersizer as described for example 1. For each treatment faeces from three replicate tanks were collected for faeces size analysis. The faeces were analyzed as described in example 1.

Figure 2:
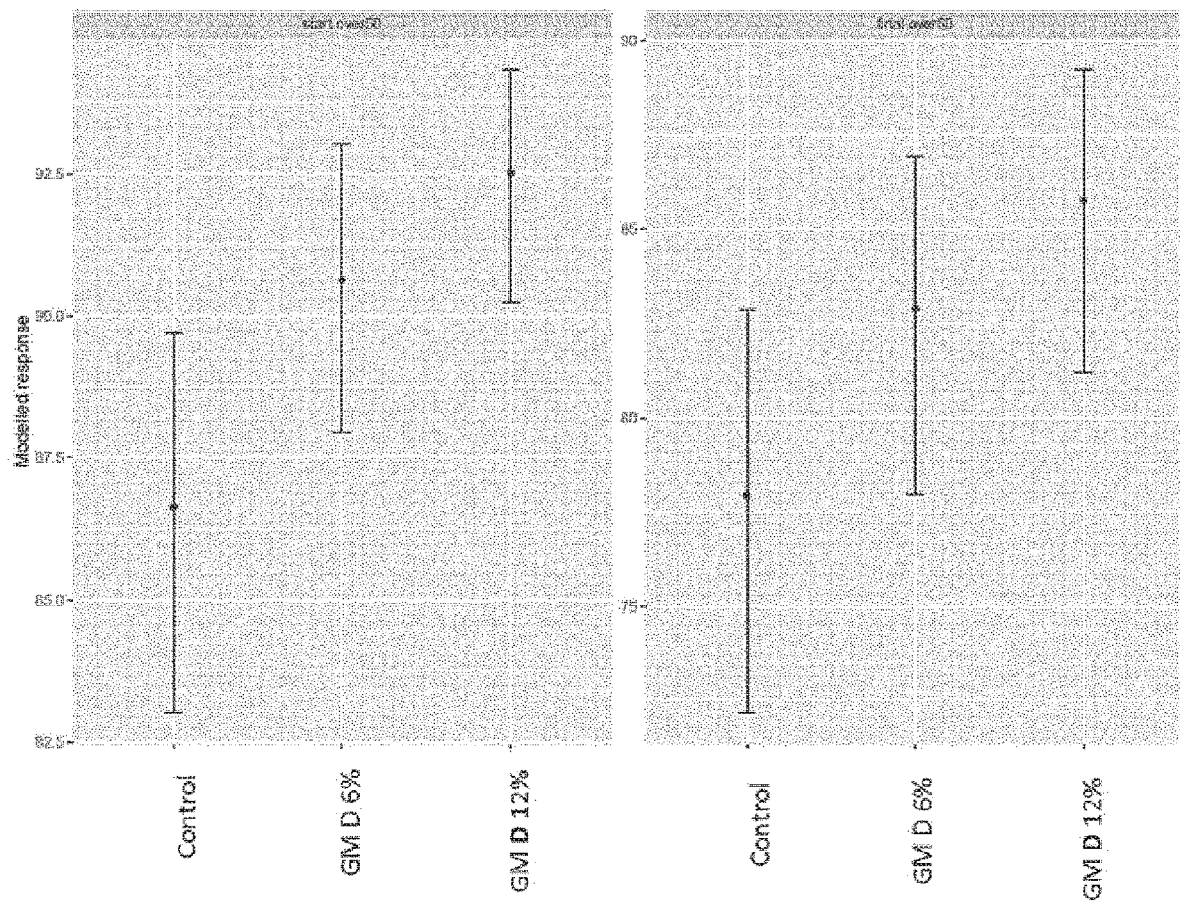
FIG. 2 shows the faeces particle size measurement by the Mastersizer for example 2. The data is shown at the start and at the final sample. Disruption of the faeces is expected with an increase in run number (i.e. reduces particle size). The y-axis gives the percentage of particles at >50 μm for the faeces. Each data point is the sample for a tank of fish (minimum 3 tanks per diet).

FIG. 2 shows a graphical representation of the data obtained from the measurements of faeces particle sizes given as % of particles larger than 50 μm for fish fed the various experimental diets. The Mastersizer uses laser diffraction to characterize particles between 0.01 and 3500 microns. Particles are added and dispersed through a media (water, air, etc.), then light is passed over the particles, and the resultant diffraction is measured. The angle and intensity of the light scattered determine the size of the particles. Then using the equivalent spheres a diameter is calculated from the diffraction pattern.

The dietary treatments are given in the headings for each result.

Example 3—Effect of Guar Meal on Faeces Particle Size

Feed Compositions

The test feeds for this trial were produced at the Technology Centre, Dirdal, Norway. The feed formulations were based on EWOS commercial 3 mm pellet containing 46% protein and 23% fat. The detailed compositions of the formulations are given in table 3.

TABLE 3

Formulations of the fish feed of example 3.

|  | Control | GM E 6% | GM F 6% | GM F 12% |
|---|---|---|---|---|
| Fish meal | 27.78 | 27.00 | 27.00 | 27.00 |
| Vegetable protein concentrate | 30.00 | 25.00 | 25.00 | 18.84 |
| Raw wheat | 11.35 | 11.23 | 11.24 | 11.22 |
| Fish oil | 8.64 | 8.66 | 8.67 | 8.69 |
| Vegetable oil | 8.64 | 8.66 | 8.67 | 8.69 |
| Vegetable protein | 10.00 | 9.53 | 9.56 | 9.50 |
| MCP | 1.03 | 1.11 | 1.08 | 1.09 |
| Amino acids | 0.92 | 1.09 | 1.09 | 1.27 |
| Vitaminbl. m/MCP 015 | 0.40 | 0.40 | 0.40 | 0.40 |
| Mineralmix EWOS | 1.22 | 1.30 | 1.27 | 1.28 |
| Yttrium Oxide | 0.02 | 0.02 | 0.02 | 0.02 |
| Guar meal E | — | 6.00 | — | — |
| Guar meal F | — | — | 6.00 | 12.00 |
|  | 100.00 | 100.00 | 100.00 | 100.00 |

Atlantic salmon (mean weight 1500 g; n=40 fish per tank) were held in tanks. Faeces were collected from each tank on a continuous basis for a limited amount of time for each tank. One sample of faeces (not less than 5 g) was collected per tank, and analysed in the Mastersizer as described for example 1. The collection of sample was repeated for the same tank for three days. So a total of three samples were analysed per tank, each analysed once by the mastersizer (as described in Example 1).

Figure 3:
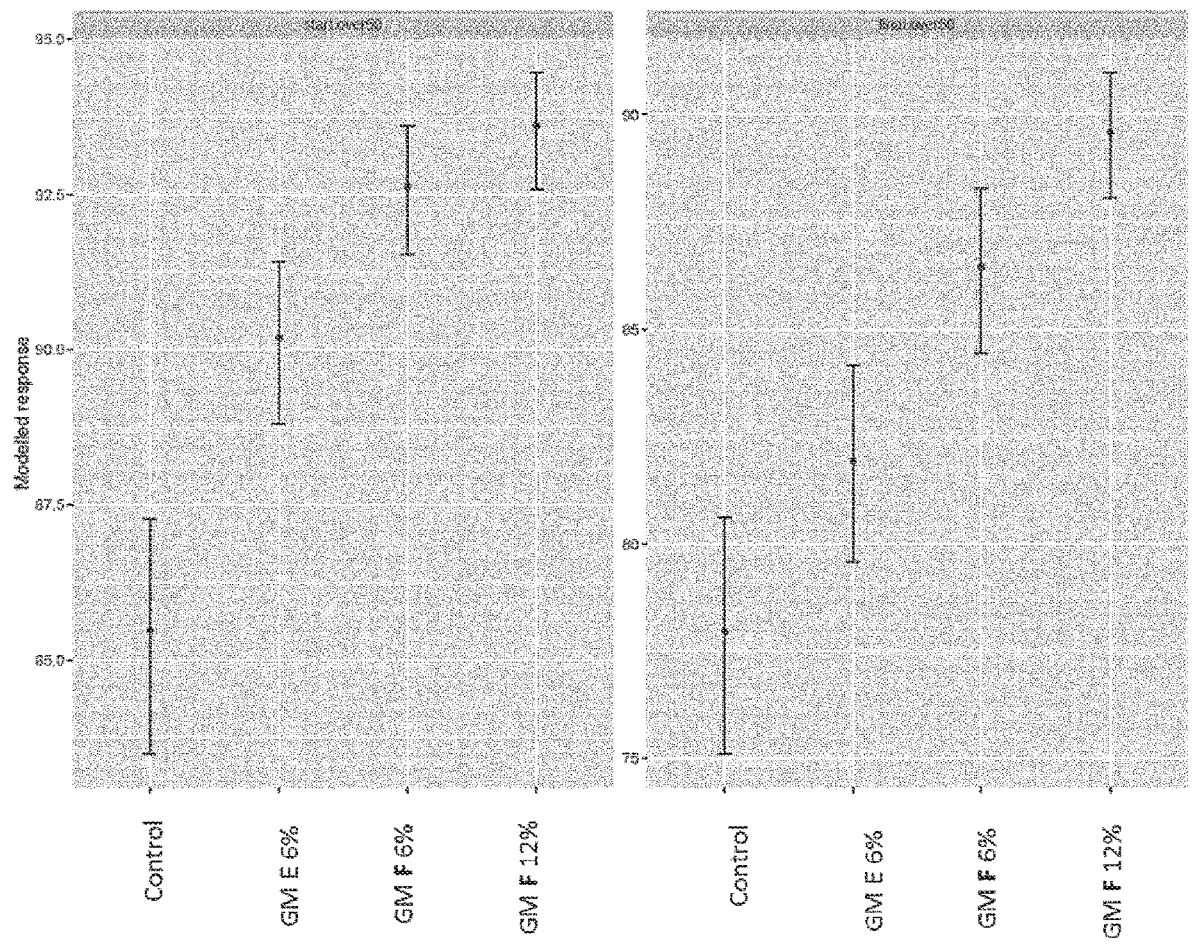
FIG. 3 shows particle size measurements for the test samples of example 3. Data is shown at the start of the Mastersizer measurement and at the end, and disruption of the faeces is expected with an increase in run number, i.e. a reduced particle size at the end of the analysis period. The y-axis gives the percentage of particles at >50 μm of the faeces. Each data point is the sample for a tank of fish (minimum 3 tanks per diet).

FIG. 3 shows a graphical representation of the data obtained for the measurements of faeces particles sizes larger than 50 μm for fish fed the various experimental diets.

The model output used in this example accounts for the variability between tanks and pools within tanks as random effects.

Digestibility of the fish fed the various experimental feeds were analyzed (yttrium oxide was added to the feeds, 0.01%). Fish were fed experimental feeds for 2 weeks. Faeces was collected from drain water during the second week using belt collectors from Holland Technology. ADC was calculated using the following equation (Bureau & Hua 2006):

$$ADC_{test\ ing} = ADC_{test\ diet} + [(ADC_{test\ diet} - ADC_{ref.diet}) * (0.7 * D_{ref} / 0.3 * D_{ing})]$$

Where:

$ADC_{test\ ing}$=the apparent digestibility coefficient of the test ingredient $ADC_{test\ diet}$=the apparent digestibility coefficient of the test diet $ADC_{ref.\ diet}$=the apparent digestibility coefficient of the reference diet $D_{ref}$=% nutrient (or kJ/g gross energy) of reference diet mash (as is)

$D_{ing}$=% nutrient (or kJ/g gross energy) of reference test ingredient (as is)

Reference: Bureau, D. P. and Hua, K. (2006). Letter to the Editor of Aquaculture. Aquaculture 252 (2006) 103-105.

The digestibility data is given in table 4 as apparent digestibility coefficient (ADC) values. Data is for each tank replicate, 2 tank replicates per feed treatment.

TABLE 4 digestibility data

|  | ADC DM | ADC Protein | ADC fat |
|---|---|---|---|
| Control | 78.4 | 89.8 | 93.2 |
| Control | 79.6 | 91.3 | 93.7 |

TABLE 4-continued digestibility data

|  | ADC DM | ADC Protein | ADC fat |
|---|---|---|---|
| Guar gum, 0.5% | 67.4 | 85.6 | 86.1 |
| Guar gum, 0.5% | 79.8 | 91.1 | 91.5 |
| Guar meal, 15% | 77.2 | 90.6 | 91.2 |
| Guar meal, 15% | 74.6 | 89.3 | 89.0 |

There is little difference between the values of the control diets and the various experimental treatments. Various studies have documented the lower digestibility of feeds containing guar gum.

The invention claimed is:

1. An extruded, pressed or particulate salmon feed comprising:
    guar meal, wherein 40/o to 66% by weight of the guar meal is protein, about 5% to about 12% by weight of the salmon feed is guar meal, and about 35% to 46% by weight of the salmon feed is protein content and 23% to 34% by weight of the salmon feed is fat content.

2. The salmon feed of claim 1, wherein the guar meal comprises protein extracted from guar germ.

3. The salmon feed of claim 1, wherein the guar meal comprises protein extracted from guar hull and guar endosperm.

4. The salmon feed of claim 1, wherein about 10% to about 25% by weight of total protein in the salmon feed is from protein in the guar meal.

5. The salmon feed of claim 1, wherein the salmon feed further comprises a starch binding agent.

6. The salmon feed of claim 1, wherein the salmon feed further comprises a non-starch binding agent.

7. The salmon feed of claim 1, wherein the salmon feed further comprises algae meal or calcium alginate.

8. A method for reduction of the content of undesired nutrients in water of a fish farm, comprising:
    feeding the salmon feed of claim 1 to fish in the fish farm, and
    removing from the water faeces particles, the salmon feed, or both, via mechanical filtration.

9. A process for increasing the mechanical strength or shear resistance of faeces from fish in a fish farm, comprising:
    feeding the salmon feed of claim 1 to fish in the fish farm.

10. An extruded, pressed or particulate salmon feed comprising guar meal and fish meal, wherein about 5% to about 12% of the salmon feed is guar meal, about 34% or less of the salmon feed is fish meal, and about 35% to 46% of the salmon feed is protein content and 23% to 34% of the salmon feed is fat content, based on total weight of the salmon feed.

11. The salmon feed of claim 10, wherein the salmon feed is in the form of pellets having a feed size suitable for salmon.

12. The salmon feed of claim 10, wherein the salmon feed comprises a salmon coloring agent.

13. The salmon feed of claim 12, wherein the salmon coloring agent is astaxanthin.

14. The salmon feed of claim 10, wherein the salmon feed comprises vegetable protein concentrate, and the vegetable protein concentrate and the guar meal taken together are about 20% to about 33% of the salmon feed by weight.

15. The salmon feed of claim 10, wherein 40% to 66% by weight of the guar meal is protein, and 10% to 25% by weight of total protein in the salmon feed is from protein in the guar meal.

16. The salmon feed of claim 1, further comprising fish meal, wherein
about 34% or less of the salmon feed is fish meal based on total weight of the salmon feed, and
43% to 46% of the salmon feed is protein content and 23% to 34% of the salmon feed is fat content based on total weight of the salmon feed.

17. A faecally-strengthened salmon feed, comprising
about 6% to about 12% by weight of the salmon feed is guar meal, and
about 18.84% to about 25% by weight of the salmon feed is vegetable protein concentrate,
wherein the protein content of the salmon feed is primarily vegetable protein by weight, about 35% to 46% by weight of the salmon feed is protein content, and 23% to 34% by weight of the salmon feed is fat content; and
digestion of the salmon feed by salmon results in faeces in which greater than 90% of the faeces particle have a particle size greater than 50 μm.

18. The salmon feed of claim 1, wherein about 6% to about 12% by weight of the salmon feed is guar meal, and digestion of the salmon feed by salmon results in faeces having a greater percentage of particles having a size of greater than 50 microns as compared to a control feed without guar meal.

19. The salmon feed of claim 1, wherein about 6% to about 12% by weight of the salmon feed is guar meal, and digestion of the salmon feed by salmon results in faeces having a greater resistance to mechanical degradation relative to a corresponding control feed without guar meal.

20. The salmon feed of claim 1, wherein the salmon is marine salmon.

* * * * *

UNITED STATES PATENT AND TRADEMARK OFFICE
CERTIFICATE OF CORRECTION

| | |
|---|---|
| PATENT NO. | : 12,035,731 B2 |
| APPLICATION NO. | : 15/491357 |
| DATED | : July 16, 2024 |
| INVENTOR(S) | : Louise Georgina Buttle et al. |

It is certified that error appears in the above-identified patent and that said Letters Patent is hereby corrected as shown below:

In the Claims

In Column 8, Claim 1, Line 3, delete "40/o" and insert -- 40% --, therefor.

Signed and Sealed this
Fifteenth Day of October, 2024

Katherine Kelly Vidal
*Director of the United States Patent and Trademark Office*